US008863728B2

(12) United States Patent
Haskara et al.

(10) Patent No.: US 8,863,728 B2
(45) Date of Patent: Oct. 21, 2014

(54) MODEL-BASED TRANSIENT FUEL INJECTION TIMING CONTROL METHODOLOGY

(75) Inventors: Ibrahim Haskara, Macomb, MI (US); Yue-Yun Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1101 days.

(21) Appl. No.: 12/857,900

(22) Filed: Aug. 17, 2010

(65) Prior Publication Data

US 2012/0042850 A1 Feb. 23, 2012

(51) Int. Cl.
*F02M 51/00* (2006.01)
*F02D 41/40* (2006.01)
*F02D 41/18* (2006.01)
*F02D 41/10* (2006.01)
*F02D 41/00* (2006.01)
*F02D 41/14* (2006.01)
*F02D 41/30* (2006.01)

(52) U.S. Cl.
CPC .......... *F02D 41/401* (2013.01); *F02D 41/1444* (2013.01); *F02D 2041/1432* (2013.01); *Y02T 10/44* (2013.01); *F02D 2200/101* (2013.01); *F02D 41/182* (2013.01); *F02D 41/3035* (2013.01); *F02D 41/107* (2013.01); *F02D 2250/21* (2013.01); *F02D 2200/0411* (2013.01); *F02D 41/0072* (2013.01); *Y02T 10/47* (2013.01); *F02D 2200/0614* (2013.01); *F02D 41/1445* (2013.01)
USPC ........... 123/478; 701/103; 701/105; 123/480; 123/568.21

(58) Field of Classification Search
CPC ................ F02D 2041/1432; F02D 2200/0411; F02D 2200/0614; F02D 2200/101; F02D 2250/21; F02D 41/0072; F02D 41/107; F02D 41/1444; F02D 41/1445; F02D 41/182; F02D 41/3035; F02D 41/401; Y02T 10/44; Y02T 10/47; Y02T 10/123; Y02T 10/18; F02B 2075/125
USPC ......... 123/295, 305, 672, 681, 478, 480, 486; 701/103, 105, 106, 108, 115; 702/182
See application file for complete search history.

(56) References Cited

U.S. PATENT DOCUMENTS

| | | | | |
|---|---|---|---|---|
| 5,157,919 A * | 10/1992 | Gopp | ............................. | 60/274 |
| 6,047,681 A * | 4/2000 | Scherer et al. | ........... | 123/406.46 |
| 6,212,467 B1 * | 4/2001 | Guzella et al. | ................ | 701/103 |
| 6,681,744 B2 * | 1/2004 | Itoyama et al. | ............... | 123/480 |
| 6,782,737 B2 * | 8/2004 | Wright | ...................... | 73/114.16 |
| 7,069,909 B2 * | 7/2006 | Pozar et al. | .................... | 123/478 |
| 7,107,143 B2 | 9/2006 | Kang | | |
| 7,117,078 B1 | 10/2006 | Gangopahyay | | |
| 7,159,389 B2 * | 1/2007 | Miura | ............................ | 60/295 |
| 7,181,332 B1 * | 2/2007 | Vick et al. | ...................... | 701/103 |
| 7,689,345 B2 * | 3/2010 | Wiggins et al. | ............... | 701/103 |
| 2006/0009902 A1 * | 1/2006 | Song et al. | .................... | 701/103 |
| 2011/0120428 A1 * | 5/2011 | Pasero et al. | .................. | 123/564 |

* cited by examiner

*Primary Examiner* — Erick Solis
*Assistant Examiner* — Carl Staubach

(57) ABSTRACT

A method for controlling a direct-injection internal combustion engine includes monitoring internal combustion engine operational parameters, determining a start of injection in response to the engine operational parameters, monitoring an intake air flow comprising a residual gas component, monitoring an exhaust gas flow, monitoring a fuel flow, determining a time constant corresponding to an intake air flow reaction time based upon the intake air flow, the exhaust gas flow, and the fuel flow, modifying the start of injection with the time constant, and operating the engine subject to the modified start of injection.

10 Claims, 4 Drawing Sheets

MODEL-BASED TRANSIENT FUEL INJECTION TIMING CONTROL METHODOLOGY

TECHNICAL FIELD

This disclosure is related to direct injection internal combustion engines.

BACKGROUND

The statements in this section merely provide background information related to the present disclosure and may not constitute prior art.

During premixed charge compression-ignition (PCCI) engine operation, auto-ignited combustion depends on the cylinder charge temperature, charge composition, and cylinder pressure at intake valve closing. Hence, the control inputs to the engine, such as amount of fuel, fuel injection timing, EGR valve open position, and intake and exhaust valve profiles, must be coordinated to ensure that those key cylinder variables are within a range where the auto-ignited combustion can be efficiently achieved. Among those inputs, the amount of residual gas available to the engine and the start of the fuel injection timing are important. The amount of residual gas available is a slow response parameter making transient conditions difficult to control without excess audible combustion noise and torque output irregularities.

During PCCI combustion, control of the variables is determined from steady-state engine calibrations. When steady-state engine operation is interrupted, such as during a requested torque transient or combustion mode transition, the engine is controlled to a new steady-state calibration at the requested operating state as determined from the new operator torque request. This type of control fails to comprehend that the engine actuators and associated control parameters can have different reaction times, with residual gas mass response among the slowest. At small torque and combustion mode transitions, the reaction times are close enough to each other that torque disturbances and audible combustion noise are minimized. At large transients, the reaction times cannot match the rate of change, resulting in a loss of combustion control until the engine actuators and associated control parameters reaction times are able to respond. The period of loss of control results in torque disturbances and audible combustion noise. When the loss of control occurs, this also results in emission spikes as the combustion process is no longer operating within operational parameters.

SUMMARY

A method for controlling a direct-injection internal combustion engine includes monitoring internal combustion engine operational parameters, determining a start of injection in response to the engine operational parameters, monitoring an intake air flow comprising a residual gas component, monitoring an exhaust gas flow, monitoring a fuel flow, determining a time constant corresponding to an intake air flow reaction time based upon the intake air flow, the exhaust gas flow, and the fuel flow, modifying the start of injection with the time constant, and operating the engine subject to the modified start of injection.

BRIEF DESCRIPTION OF THE DRAWINGS

One or more embodiments will now be described, by way of example, with reference to the accompanying drawings, in which.

DETAILED DESCRIPTION

Figure 1:
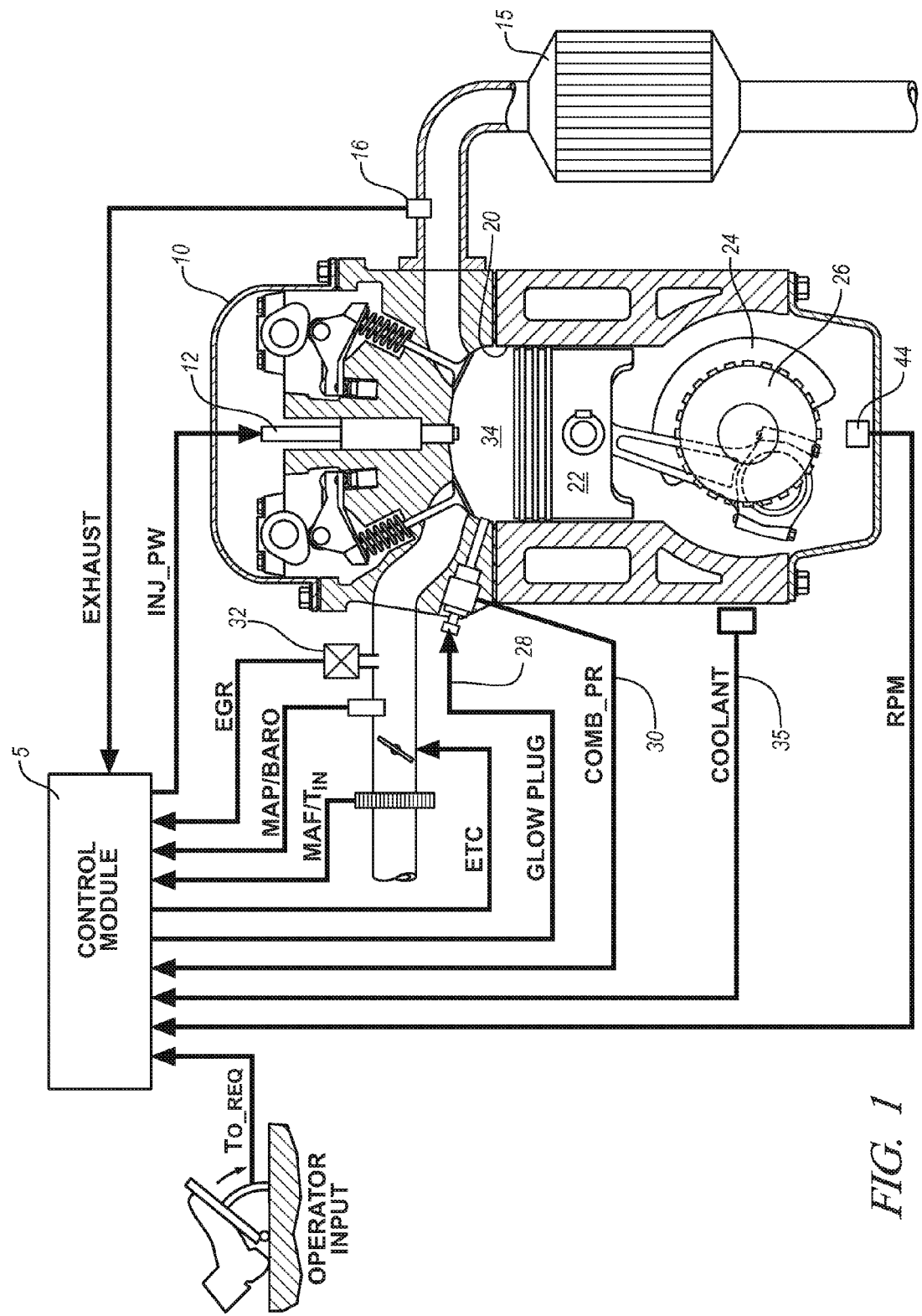
FIG. 1 is a schematic diagram depicting an exemplary internal combustion engine, control module, and exhaust aftertreatment system, constructed, in accordance with an embodiment of the disclosure.

Referring now to the drawings, wherein the showings are for the purpose of illustrating certain exemplary embodiments only and not for the purpose of limiting the same, FIG. 1 is a schematic diagram depicting an exemplary internal combustion engine 10, control module 5, and exhaust aftertreatment system 15, constructed in accordance with an embodiment of the disclosure. The exemplary engine 10 includes a multi-cylinder, direct-injection, compression-ignition internal combustion engine 10 operable in a premixed charge compression-ignition (PCCI) combustion mode having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine 10 preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft 24 and rotates therewith. The engine 10 includes sensing devices to monitor engine operation, and actuators which control engine operation. The sensing devices and actuators are signally or operatively connected to control module 5.

The engine 10 preferably includes a direct-injection, four-stroke, internal combustion engine 10 including a variable volume combustion chamber defined by the piston reciprocating within the cylinder between top-dead-center (TDC) and bottom-dead-center (BDC) points and a cylinder head including an intake valve and an exhaust valve. The piston 22 reciprocates in repetitive cycles each cycle including intake, compression, expansion, and exhaust strokes.

The engine 10 preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine 10, a combustion event occurs during each engine cycle when a fuel charge is injected into the combustion chamber 34 to form, with intake air, cylinder charge. The intake air includes a residual exhaust gas component, as will be described in detail below, and a fresh air component. The cylinder charge is subsequently combusted by action of compression thereof during the compression stroke.

The engine 10 is configured to operate over a broad range of temperatures, cylinder charge (air, fuel, and residual gas) and injection events. The methods described herein are particularly suited to operation with direct-injection compression-ignition engines operating lean of stoichiometry to determine states of engine control actuators and associated engine operating parameters which correlate to heat release in each of the combustion chambers during ongoing operation. The methods are further applicable to other engine configurations, including spark-ignition engines, including those adapted to use homogeneous charge compression-ignition (HCCI) strategies. The methods are also applicable to transients between combustion modes, e.g., an engine operable in both compression ignition and PCCI or both spark ignition and HCCI. The methods are applicable to systems utilizing exhaust gas rebreathing operations, e.g., valve overlap designed to intake recently expelled exhaust gas (internal exhaust gas recirculation) or individual variable valve actuation, wherein knowledge of a residual gas mass amount is used for combustion control.

Sensing devices are installed on or near the engine 10 to monitor physical characteristics and generate signals which are correlatable to states of engine operating parameters and states of ambient conditions. The sensing devices include a crank sensor 44 for monitoring crankshaft speed (RPM) through sensing edges on the teeth of the multi-tooth target wheel 26. The crank sensor 44 is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal COMB_PR of the sensing element of combustion pressure sensor 30 is proportional to cylinder pressure. The sensing element of combustion pressure sensor 30 includes a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor 16 (EXHAUST), e.g., wide-band air/fuel sensor, electrochemical, infrared, ultrasonic, and laser, for monitoring states of one or more exhaust gas parameters, e.g., temperature, air/fuel ratio, oxygen content, and constituents. One skilled in the art understands that there may other sensing devices and methods for purposes of control and diagnostics. The operator input, in the form of the operator torque request, ($T_{O\_REQ}$), is typically obtained through a throttle pedal and a brake pedal, among other devices. The engine 10 is preferably equipped with other sensors for monitoring engine operating states and for purposes of system control. Each of the sensing devices is signally connected to the control module 5 to provide signal information which is transformed by the control module 5 to determine the state of the respective monitored engine operating parameter. It is understood that this configuration is illustrative, not restrictive, including the various sensing devices being replaceable with functionally equivalent devices and algorithms.

The actuators are installed on the engine 10 and controlled by the control module 5 to control states in response to operator inputs. This includes controlling a state of each control parameter for each actuator to achieve states of engine operating parameters. Actuators include an electronically-controlled throttle device which controls throttle opening to a commanded input (ETC), and a plurality of fuel injectors 12 for directly injecting fuel into each of the combustion chambers in response to a command signal (INJ_PW), all of which are controlled in response to the operator torque request ($T_{O\_REQ}$). There is an exhaust gas recirculation (EGR) valve 32 and cooler, which controls flow of externally recirculated exhaust gas to the engine intake, in response to a control signal (EGR) from the control module 5. It is appreciated that the mass of in-cylinder residual gas is a combination of the externally recirculated exhaust gas and any remaining in-cylinder exhaust gas from a previous engine cycle. The glow-plug 28 includes a known device, installed in each of the combustion chambers, which houses the combustion pressure sensor 30.

The fuel injector 12 is an element of a fuel injection system that includes a plurality of fuel injector devices each configured to directly inject the fuel charge, i.e., a mass of fuel, into one of the combustion chambers 34 in response to the command signal, INJ_PW, from the control module 5. Each of the fuel injectors 12 is supplied pressurized fuel from a fuel distribution system, and has operating characteristics including a minimum pulse width and an associated minimum controllable fuel flow rate, and a maximum fuel flow rate. Operating parameters associated with the command signal (INJ_PW) include start of injection (SOI) and pulse width (INJ_PW). SOI is the relation between the position of the piston 22 in the cylinder 34 in degrees before top dead center at which fuel injection starts during the compression stroke of engine operation.

The engine 10 may be equipped with a controllable valvetrain operative to adjust openings and closings of intake and exhaust valves of each of the cylinders, control parameters include one or more of valve timing, valve phasing (i.e., timing relative to crank angle and piston position), and magnitude of lift of valve openings. One exemplary system includes variable cam phasing (VCP) and variable lift control (VLC), which are applicable to compression-ignition engines, spark-ignition engines, PCCI engines, and HCCI engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to achieve states for engine control actuators, including throttle position (ETC), fuel injection mass (INJ_PW), SOI, EGR valve position (EGR) to control flow of recirculated exhaust gases, glow-plug operation (GLOWPLUG), and control of intake and/or exhaust valve timing, phasing, and lift on systems so equipped. The control module 5 is configured to receive input signals from the operator (e.g., a throttle pedal position and a brake pedal position) to determine the operator torque request $T_{O\_REQ}$ and determine states of engine operating parameters from the sensors indicating the engine speed (RPM) and intake air temperature ($T_{IN}$), and coolant temperature and other ambient conditions. The control module 5 may be operated in open loop, without combustion feedback control, or closed loop, with combustion feedback control.

In exemplary compression-ignition engine applications, the engine 10 is operating in PCCI combustion mode. The PCCI combustion mode includes partial injection of fuel early in the compression stroke of the combustion cycle leading to premixed fuel and intake air in the combustion chamber 34 to effect low temperature combustion and is controlled at a lean or stoichiometric air/fuel ratio. In one embodiment, a residual gas fraction, i.e., a mass of in-cylinder residual gas as a percentage of mass of a total cylinder charge is controlled to a high dilution rate, e.g., greater than 40% of the cylinder charge mass. The intake and exhaust valves are controlled in a low-lift valve position and the intake and exhaust lift timing operate in a negative valve overlap (NVO) condition, on systems so equipped.

Figure 2:
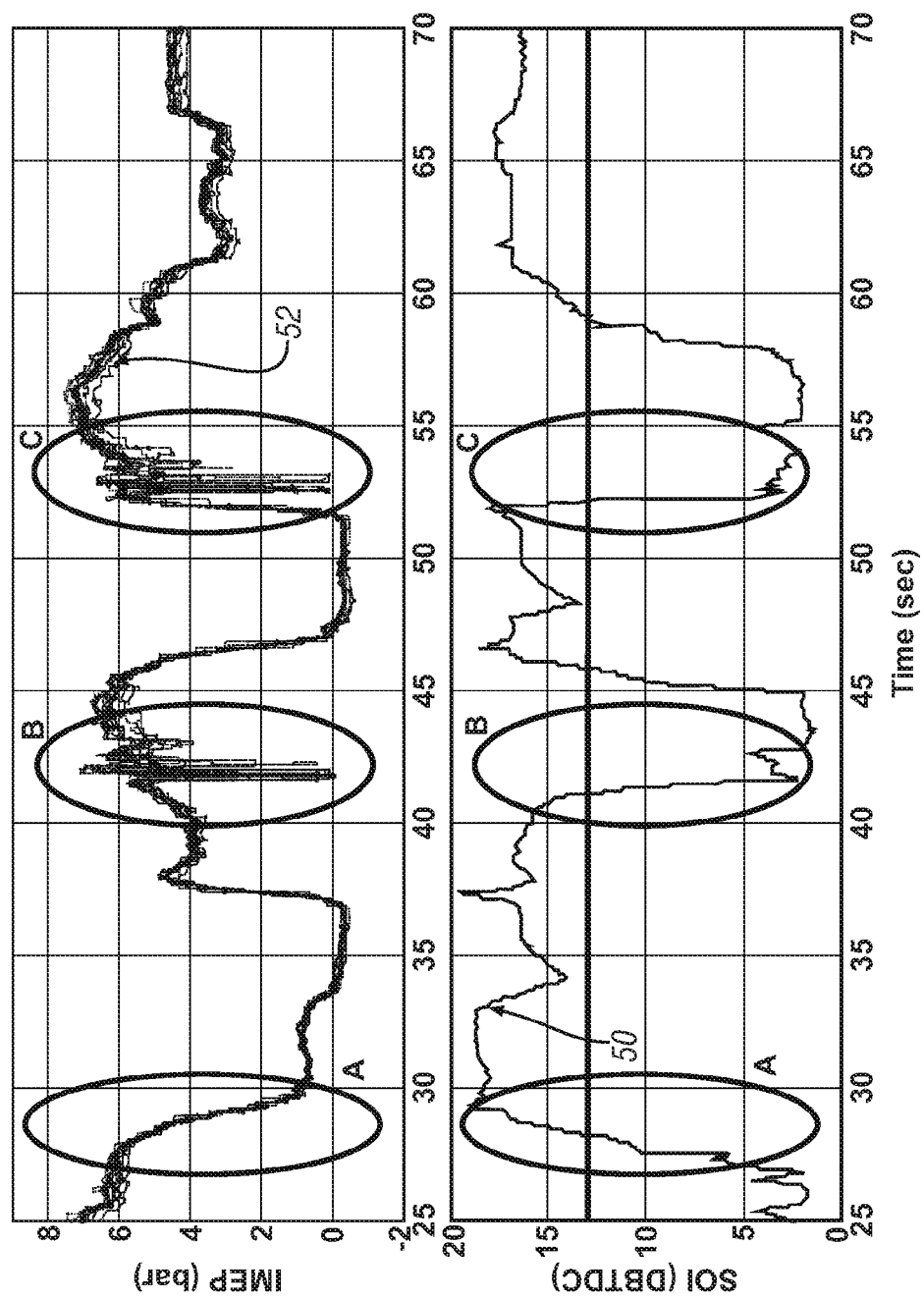
FIG. 2 is graphical data taken from a known compression-ignition internal combustion engine operating in PCCI combustion mode during operation, in accordance with an embodiment of the disclosure.

FIG. 2 is graphical data taken from a known compression-ignition internal combustion engine 10 operating in PCCI combustion mode during operation. Monitored engine operating parameters of SOI and indicated mean effective pressure (IMEP) are shown over time. A transient operation occurs when a change in the operator torque request ($T_{O\_REQ}$) is detected by the control module 5 and requires a change in engine operating parameters in response to the change in the operator torque request. An SOI trace is generally shown at 50 and is a function of fuel injected into the cylinder 34 in degrees before top dead center (DBTDC) and a corresponding IMEP trace is generally shown at 52 and depicted as pressure (bar). The SOI trace 50 is related to the operator torque request ($T_{O\_REQ}$) wherein a change in the operator torque request causes a change to SOI. The IMEP trace 52 shows the resultant force of the combustion process on the top of the piston 22. The IMEP trace 52 is therefore the force pushing the piston 22 down and turning the crankshaft 26 to produce output torque. It is appreciated that IMEP has a direct relation to engine operating torque but before engine losses, e.g., frictional losses, are taken into account.

Known control schemes for operating the engine in the PCCI combustion mode include using steady-state mapping to determine preferred states for engine control associated with various actuators, e.g., fuel injection mass and timing, EGR valve position, EGR mass flow, glow-plug operation, and intake and/or exhaust valve timing, phasing and lift, in response to the operator torque request and environmental conditions. When the operator torque request ($T_{O\_REQ}$) changes from the current steady-state map to a new steady-state map, the control scheme changes from the current steady-state map to the new steady-state map engine operating parameters.

Each engine control actuator has a reaction time associated with a change in state, which means that there is a time delay between a commanded change in state of an engine control actuator and a change in state of a related engine operating actuator. Certain actuators are known to have a fast dynamic response and can adjust to a new commanded output within a single cycle or cylinder event and are known as fast engine actuators. Fast engine actuators include, e.g., injection timing, spark timing, and valve lift. Other engine actuators are relatively slower to effect a change in response to a control signal and take multiple engine cycles or cylinder events to adjust to a new commanded output due to component inertias, mechanical response times, and airflow lags and are known as slow engine actuators. Slow engine actuators include, e.g., EGR valve position and corresponding residual gas flow, throttle position, and valve phasing. Discrepancies in response times between the fast engine actuators and the slow engine actuators can disrupt the combustion process which can be displayed on an IMEP trace.

A slow transient is a change in operator torque request, below a threshold, that results in the slow and fast engine control actuators being able to maintain robust combustion during the change in the operator torque request. An example of the slow transient related to operator torque request is indicated on the SOI trace 50 during the period designated as A. The resulting IMEP trace 52, also designated as A over the same time period, indicates a smooth transition occurs. A fast transient is a change in operator torque request, above a threshold, that results in the engine control actuators being unable to maintain robust combustion during the change in the operator torque request. Engine control actuators that are of interest include EGR valve position and EGR mass flow. Examples of fast transients are shown on the SOI trace 50 designated as B and C. In both cases, the resultant uncontrolled IMEP trace 52 is a discontinuous curve, as designated as B and C, respectively, indicating unstable combustion. The states of the slow engine actuators are unable to sustain robust combustion without excessive audible combustion noise. This variation is a result of incomplete combustion and results in emission spikes during fast transient conditions.

Figure 3:
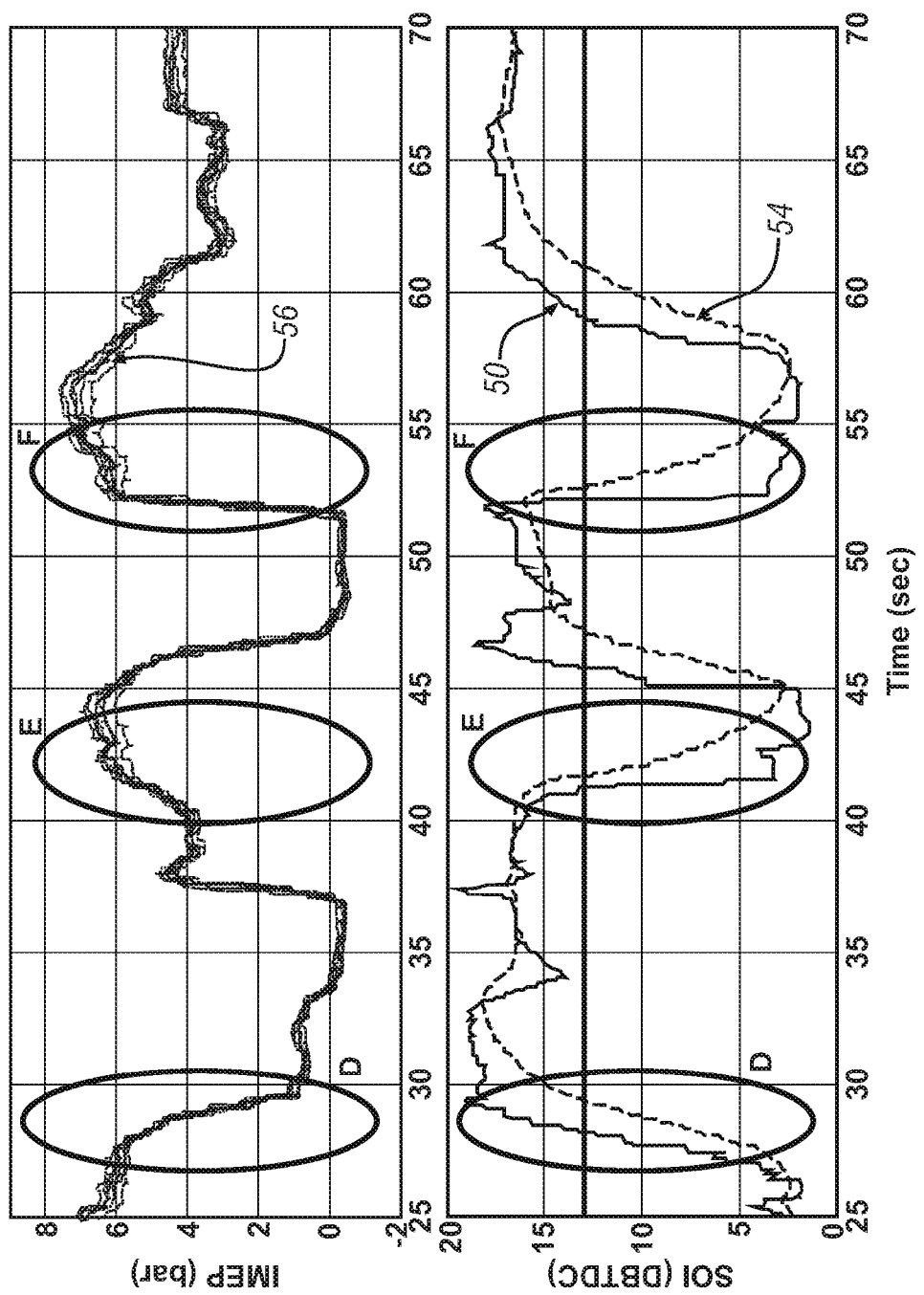
FIG. 3 is graphical data taken from operation of an embodiment of the disclosure during engine operation in PCCI combustion mode during operation including control parameter SOI and operating parameter IMEP shown over time, in accordance with an embodiment of the disclosure.

FIG. 3 is graphical data taken from operation of an embodiment of the disclosure during engine operation in PCCI combustion mode during operation, including states of the control parameter SOI and engine operating parameter IMEP shown over time. The SOI graph depicts the uncontrolled SOI trace 50 overlaid with a controlled SOI trace 54 of the preferred embodiment under similar testing conditions. The controlled SOI trace 54 utilizes a time constant (τ) to adjust SOI to control the combustion process and reduce the audible combustion noise, torque disruptions, and emission spikes with respect to the process associated with FIG. 5 and described in detail below. The time constant τ is a term that takes into consideration the response time of the engine operating parameters and various engine actuators. The control system uses the time constant τ to ensure the engine 10 operates within an acceptable combustion noise limit and without torque or emissions disruptions by determining residual gas flow and a mass of in-cylinder residual gas, as described herein.

In the preferred embodiment, the residual gas fraction is determined using information received from the mass air flow sensor (MAF) and the exhaust gas sensor (EXHAUST). The residual gas fraction is determined using the control module 5 by tracking burned mass flows and unburned mass flows in the intake manifold and the exhaust gas feedstream. These intake and exhaust gas compositions can be used to determine the time constant τ. Once the time constant τ is determined, it is used to modify state of the control parameter SOI as shown in trace 54 in relation to the unmodified trace 50. The modified state of the SOI parameter results in a smoother SOI trace 54 and particularly, the transient conditions now occur over a longer period of time. However, the IMEP trace 56 remains relatively unchanged and responsive to the operator torque request. During the fast transient portions, indicated at E and F, the IMEP maintains a continuous transition, eliminating torque instability, audible combustion noise, and emissions spikes.

Figure 4:
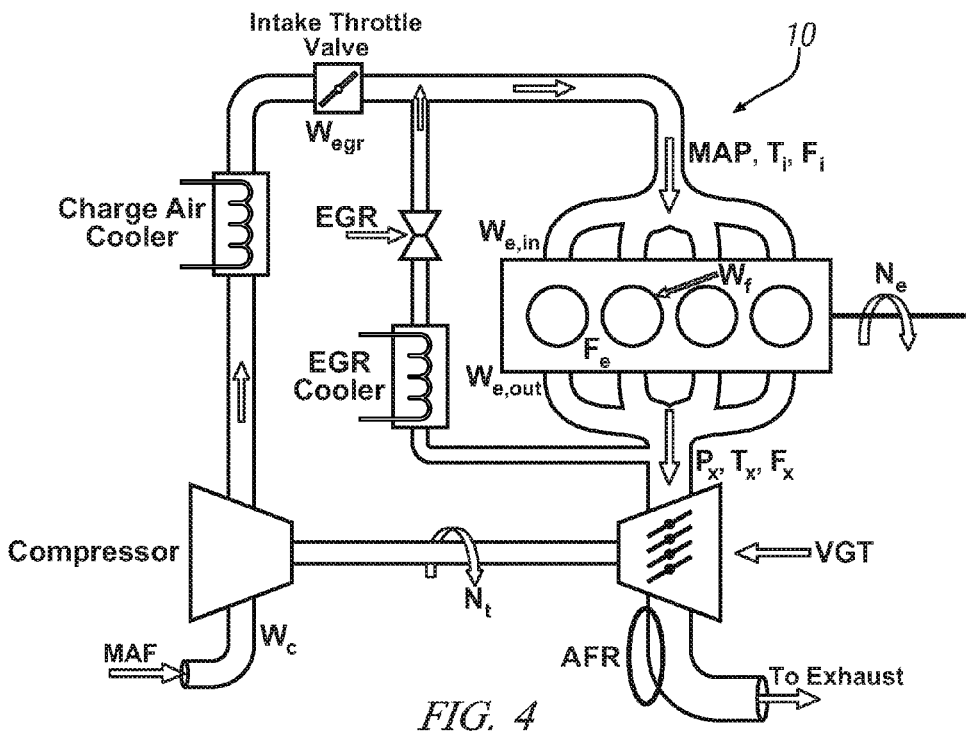
FIG. 4 schematically depicts an exemplary compression ignition internal combustion engine graphically displaying variables used for determining the time constant, in accordance with an embodiment of the disclosure.

Determination of the time constant τ can be further explained by reviewing the following equations. FIG. 4 schematically depicts an exemplary compression ignition internal combustion engine 10 graphically displaying variables used for determining the time constant. The dominant dynamics for the residual gas fraction must be rationalized. This may be determined by computing residual gas fraction dynamics in both intake and exhaust air flow rate (AFR) as follows:

$$[O_{2i,x}] = g(1 - F_{i,x}) \qquad [1]$$

where $O_{2\,i,x}$ is the oxygen concentration at the intake manifold and in the exhaust gas feedstream, g is a constant scaling factor, e.g., oxygen concentration of air, and $F_{i,x}$ is burned exhaust fractions in intake and exhaust manifolds, respectively. Residual gas fraction dynamics at the intake manifold are determined by:

$$\dot{F}_i = \frac{1}{V_i \rho_i}(W_{egr}(F_x - F_i) - W_c F_i) \qquad [2]$$

where $V_i$ is the volume of the intake manifold, $\rho_i$ is the air density at the intake, $W_{egr}$ is flow of the EGR gas into the intake manifold, and $W_c$ is the flow of fresh air through a compressor, such as a turbo charger or super charger (or in the case of a normally aspirated engine, the fresh air within the intake). Residual gas fraction dynamics at the exhaust manifold are determined by:

$$\dot{F}_x = \frac{1}{V_x \rho_x}(W_{e,out}(F_e - F_x)) \qquad [3]$$

where $V_x$ is the volume of the exhaust manifold, $\rho_x$ is the air density at the exhaust, and $W_{e,out}$ is flow of exhaust gas at the exhaust manifold. The residual gas fraction at engine-out after combustion $F_e$ is calculated as:

$$F_e = \frac{F_i W_{e,in} + (1 + AFR_s)W_f}{W_{e,in} + W_f} \qquad [4]$$

where $W_{e,in}$ is intake air (exhaust gas and fresh air) inducted into the cylinder, $AFR_s$ is the stoichiometric air fuel ratio, and $W_f$ is fuel flow into the cylinder. Substituting equation 4 into equation 3, the residual gas fraction dynamics at the exhaust becomes:

$$\dot{F}_x = \frac{1}{m_x}(W_{e,in} F_i - W_{e,out} F_x + (1 + AFR_s)W_f) \qquad [5]$$

where $m_x$ is the mass at the exhaust, or $V_x \rho_x$ from Equation 3. At steady state, the residual gas fraction at the intake (from equation 2) and the residual gas fraction at the exhaust (from equation 5), are respectively:

$$F_i = F_x \cdot \frac{W_{egr}}{W_c + W_{egr}} \qquad [6]$$

and $$F_x = \frac{1 + AFR_s}{1 + AFR} \qquad [7]$$

where AFR is actual air fuel ratio. It should be noted that residual gas fraction dynamics are linear in the states excited by fuel flow, however, the coefficients encompass several flow terms. The exhaust dynamics are much faster than the intake dynamics and therefore the residual gas fraction at the exhaust manifold, $F_x$, is approximately equal to the exhaust fraction at the cylinders after combustion, $F_e$.

To eliminate a second state from the equations, a singular perturbation theory, as is known by one of ordinary skill in the art, may be applied. The in-cylinder residual gas fraction prior to combustion directly relates to a percentage of EGR in the intake air at the time of combustion and behaves with the following dynamics:

$$\dot{F}_i = \frac{W_{e,in}}{m_i}\left[-\frac{W_c + W_{egr}}{W_{e,in}} + \frac{W_{egr}}{W_{e,out}}\right]F_i + \frac{W_{egr}}{W_{e,out}}\frac{W_f}{m_i}(1 + AFR_s) \qquad [8]$$

where $m_i$ is the mass at the intake, or $V_i \rho_i$ from Equation 2. When the equation is expressed in a first-order filter with a variable time constant, the equation can be written as:

$$\bar{F}_i = \tau \cdot \dot{F}_i + F_i \qquad [9]$$

which, for steady-state, is:

$$\bar{F}_i = \frac{W_{egr}}{W_c + W_{egr}} \cdot \frac{1 + AFR_s}{1 + (W_c/W_f)} \qquad [10]$$

Therefore, the time constant that describes the dominant dynamics for the residual gas fraction can be defined as:

$$\tau = \frac{W_{e,in} + W_f}{W_c + W_f\left(\frac{W_c + W_{egr}}{W_{e,in}}\right)} \cdot \frac{120 V_i}{V_d N \eta_v} \qquad [11]$$

where $V_d$ is displacement volume for the cylinder, N is engine speed, and $\eta_v$ is volumetric efficiency. It will be appreciated that volumetric efficiency is determined by methods known in the art.

Transient timing correction is derived using the instantaneous residual gas fraction of the intake air entering the combustion chamber, which may be determined from the previous relation and is written as:

$$F_{i,k} = \left(1 - \frac{T_s}{\tau}\right) \cdot F_{i,k-1} + \frac{T_s}{\tau} \cdot \bar{F}_i \qquad [12]$$

where $F_{i,k}$ is the instantaneous residual gas fraction from the previous cycle and $T_s$ is sampling time. Therefore, the change in the instantaneous residual gas fraction can be expressed as:

$$\Delta F_{i,k} = F_{i,k} - \overline{F}_i = \left(1 - \frac{T_s}{\tau}\right) \cdot \Delta F_{i,k-1} \quad [13]$$

Upon calculation of the instantaneous residual gas fraction available for use in a cylinder charge, the amount of timing perturbation can be determined. The timing perturbation is determined from steady state mapping which includes the SOI parameter. The SOI is initially controlled to a steady state value as determined from the steady state mapping when the engine 10 is started. As the operator torque request is received at the control module 5, a new steady state map is referred under the requested conditions. Therefore, the timing perturbation is calculated to determine an amount of perturbation for a given transient intake air amount during the transient. With the SOI parameter indicated by the letter u and the steady state indicated by $\overline{u}$, the SOI parameter at steady state can be defined as:

$$\overline{u} = g(\overline{F}) \quad [14]$$

and $$\overline{u} + \Delta u = g(\overline{F} + \Delta F) \quad [15]$$

with the change in state of the SOI parameter defined as:

$$\Delta u = h(\overline{F} + \Delta F) - h(\overline{F}) \approx \frac{\partial g}{\partial F} \Delta F \quad [16]$$

$$\Delta u_k \approx \frac{\partial g}{\partial F} \Delta F_k \quad [17]$$

$$\Delta u_{k-1} \approx \frac{\partial g}{\partial F} \Delta F_{k-1} \quad [18]$$

Utilizing the above equations, determining the change in the state of the SOI parameter in relation to the residual gas fraction may be found by:

$$\Delta u_k = \left(1 - \frac{T_s}{\tau}\right) \cdot \Delta u_{k-1} \quad [19]$$

$$u_k = \left(1 - \frac{T_s}{\tau}\right) \cdot u_{k-1} + \frac{T_s}{\tau} \cdot \overline{u} \quad [20]$$

A first order filter may then be calculated to modify the baseline SOI (U(bar)) as:

$$\frac{1}{\tau \cdot s + 1} \quad [21]$$

It will be apparent that, although exemplary equations have been described in detail herein, other equations may be substituted that to provide similar results.

Figure 5:
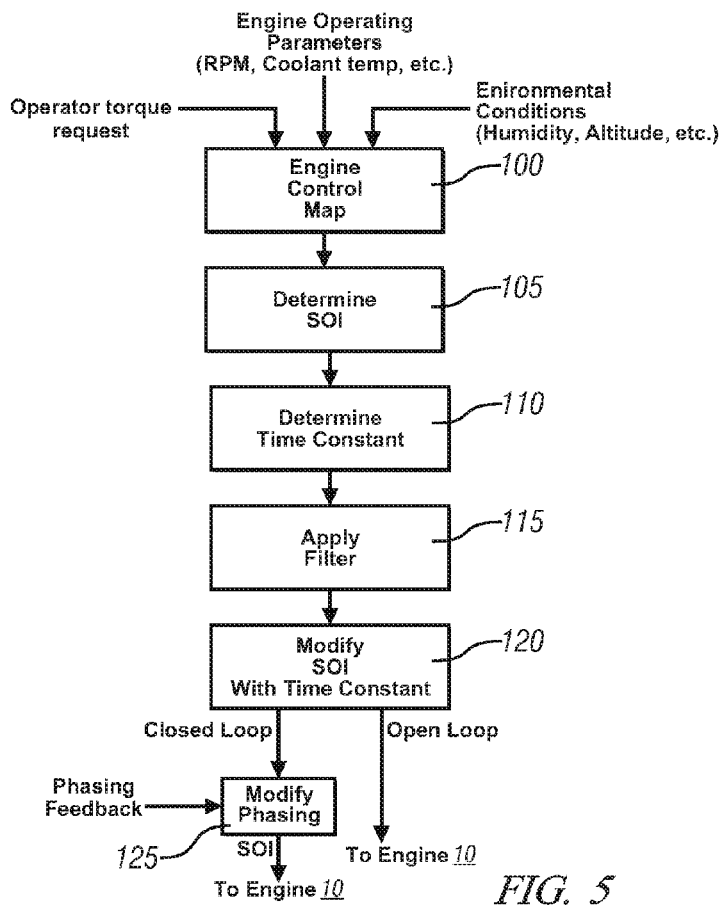
FIG. 5 depicts an exemplary control scheme utilizing equations to calculate a transient timing correction factor for exemplary PCCI engines in either open loop or closed loop control, in accordance with an embodiment of the disclosure.

FIG. 5 depicts an exemplary control scheme utilizing the aforementioned equations to calculate a transient timing correction factor for exemplary PCCI engines in either open loop or closed loop control. When operating in open loop control, the control module 5 monitors operator torque request (To_REQ), and monitors atmospheric conditions (MAP/BARO), and engine operating parameters, e.g., engine speed (RPM) and coolant temperature (COOLANT). A predetermined engine control map, i.e. look-up table, (100) is consulted to determine engine operating parameters, including an initial state for the SOI parameter. The SOI and fuel load parameters (INJ_PW) are determined (105) for the current operating conditions and requests. The time constant $\tau$ can then be determined (110), e.g., as described herein at equation 11, and input to calculate the first order filter (115), e.g., defined in equation 21. The first order filter (115) is used to modify the SOI based on the transient dynamics the residual gas associated with response of the EGR system. The time constant $\tau$ is calculated and the first order filter modifies the SOI based on the instantaneous flow characteristics of the residual gas as described above for the specific cylinder charge and determines a final SOI (120). This provides the engine 10 with a torque output having minimal torque disruptions, minimal objectionable audible combustion noise, and reduced emission spikes based on the transient dynamics of the residual gas flow.

When operating in closed loop control, the control module 5 receives the same inputs and engine operating parameters and as the open loop control but also includes a phasing controller (125) to receive phasing feedback from the combustion pressure sensor 30. The control module 5 receives the inputs and engine operating parameters and determines a preferred engine combustion phasing, or a target phasing, for the present operating conditions from a predetermined engine control map (100). The engine control map provides an initial state for the SOI (105). The time constant is determined (110), e.g., as defined in equation 11, and input to calculate the first order filter (115), e.g., as defined in equation 21. The first order filter is used to modify the initial SOI as determined at 105 to calculate a final state for the SOI at 120. The phasing controller (125) uses the final SOI and phasing feedback from the combustion pressure sensor 30 to determine the state for SOI for the specific combustion cycle. The first order filter modifies the target phasing signal to determine the proper final target phasing control signal based on the calculated instantaneous flow characteristics and the time constant for the specific cylinder charge. This provides engine torque output with minimal torque disruptions, minimal objectionable audible combustion noise, and reduced emission spikes.

In an additional embodiment, the control module 5 can determine between steady state operation and transient operation. When the engine 10 is operating in steady state, the control module maintains operation based on the steady state operating parameters of the engine control map 100, including the SOI 105. When a transient is detected, the time constant $\tau$ is determined 110, the first order filter is applied 115, and the SOI is modified 120. If a closed loop control is used, the phasing controller (125) uses the final SOI and phasing feedback from the combustion pressure sensor 30 to determine the state for SOI for the specific combustion cycle.

In another embodiment, the control module 5 can determine the threshold in the operator torque request that delineates the slow transient and fast transient. When a slow transient is detected, the engine 10 maintains operation according to the engine control map 100 control scheme and the time constant $\tau$ is not calculated and the first order filter 115 is not applied. When a fast transient is detected, the time constant $\tau$ is determined 110, the first order filter is applied 115, and the SOI is modified 120. If a closed loop control is used, the phasing controller (125) uses the final SOI and phasing feedback from the combustion pressure sensor 30 to determine the state for SOI for the specific combustion cycle.

As will be apparent to one of ordinary skill in the art, the control scheme can be operated utilized with engines having any one of a number of differing air and EGR actuation mechanisms. For example, the control scheme can be operable with an engine operating with a valve controlled rebreathing strategy or an individual variable valve actuation strategy.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a direct-injection internal combustion engine, comprising:
    monitoring internal combustion engine operational parameters including a monitored engine speed;
    determining a start of injection in response to the engine operational parameters;
    monitoring an intake air flow into the engine comprising a residual gas component and fresh air flow into an intake manifold of the engine;
    monitoring an exhaust gas flow into the intake manifold;
    monitoring a fuel flow into the engine;
    determining a steady-state in-cylinder residual gas fraction based upon the exhaust gas and fresh air flows into the intake manifold and the fuel flow into the engine;
    determining a time constant corresponding to an intake air flow reaction time based upon the intake air flow, the exhaust gas flow, engine speed, and the fuel flow;
    calculating an instantaneous in-cylinder residual gas fraction using the steady-state in-cylinder residual gas fraction and the time constant;
    modifying the start of injection based upon the calculated instantaneous in-cylinder residual gas fraction; and
    operating the engine subject to the modified start of injection.

2. The method of claim 1, further comprising detecting a fast transient from an operator torque request; and
    wherein modifying the start of injection based upon the calculated instantaneous in-cylinder residual gas fraction is predicated upon the monitored fast transient.

3. The method of claim 1, further comprising detecting a fast transient from an operator torque request; and
    wherein determining the time constant is predicated upon the monitored fast transient.

4. The method of claim 1, wherein determining the start of injection comprises referencing a look-up table.

5. The method of claim 1, wherein monitoring an intake air flow comprising the residual gas component comprises determining the residual gas component within the intake air flow resulting from an internal exhaust gas recirculation.

6. The method of claim 1, wherein monitoring an intake air flow comprising the residual gas component comprises determining the residual gas component within the intake air flow resulting from an external exhaust gas recirculation.

7. The method of claim 1, wherein modifying the start of injection based upon the calculated instantaneous in-cylinder residual gas fraction comprises a closed loop combustion feedback control.

8. The method of claim 1, wherein modifying the start of injection based upon the calculated instantaneous in-cylinder residual gas fraction comprises an open loop combustion control.

9. The method of claim 1, further comprising:
    monitoring a volumetric efficiency of the engine; and
    wherein determining the time constant corresponding to the intake air flow reaction time is further based upon the volumetric efficiency of the engine.

10. The method of claim 1, wherein monitoring an exhaust gas flow comprises monitoring an exhaust gas fraction within the exhaust gas flow with an exhaust gas sensor.

\* \* \* \* \*